United States Patent [19]

Viszlai

[11] Patent Number: 5,431,932
[45] Date of Patent: Jul. 11, 1995

[54] PROCESS FOR THE PRODUCTION OF CHEESES BY STANDARDIZING

[76] Inventor: Bela Viszlai, Kassai u. 44, H-3800 Szikszo, Hungary

[21] Appl. No.: 108,727

[22] PCT Filed: Dec. 23, 1992

[86] PCT No.: PCT/HU92/00062
§ 371 Date: Nov. 18, 1993
§ 102(e) Date: Nov. 18, 1993

[87] PCT Pub. No.: WO93/12663
PCT Pub. Date: Jul. 8, 1993

[30] Foreign Application Priority Data

Jan. 2, 1992 [HU] Hungary .................................. 7/92

[51] Int. Cl.⁶ .............................................. A23C 19/05
[52] U.S. Cl. ....................................... 426/37; 426/36; 426/582
[58] Field of Search ............................ 426/36, 582, 37

[56] References Cited

U.S. PATENT DOCUMENTS 3,899,605  8/1975  Schaap ................................ 426/582

FOREIGN PATENT DOCUMENTS 219958   2/1962  Austria .
362220   5/1981  Austria .
504092   4/1939  United Kingdom .
90/00353 1/1990  WIPO .

Primary Examiner—Joseph Golian
Attorney, Agent, or Firm—Herbert Dubno

[57] ABSTRACT

Process for the production of cheeses by standardizing, in the course of which milk is skimmed, the separated cream is treated, then the fat content of the kettle milk is adjusted by means of the treated cream, then it is cold-ripened, afterwards culturing, adding of additives, in certain cases curdling take place, then, it is coagulated, chopped, heated; the separation of whey, shaping, pressing, salting take place, then it is ripened; wherein the size of fat balls within milk the milk is reduced to below 2,5 micron by ultrasonic treatment or by treatment in Venturi-tube, in ball and tube mill, or in atomizer. The diameter of the fat balls is reduced to 0,6–1,3 micron. The ultrasonic treatment of the cream is carried out at a vawe length of 10,000–50,000 Hz. The duration of the ultrasonic treatment of the cream is up to 300 sec. The skimmed milk is pasteurized. The kettle milk is cold-ripened for 4–10 hours. Sterilized milk and cream are heated to a temperature of 28°–40° C. prior to culturing.

4 Claims, No Drawings

PROCESS FOR THE PRODUCTION OF CHEESES BY STANDARDIZING

FIELD OF THE INVENTION

The present invention relates to the production of cheese products by standardization, in the course of which milk is skimmed, the separated cream is treated, then the fat content of the kettle milk is adjusted by means of the treated cream, then it is cold-ripened, afterwards culturing, adding of additives, in certain cases curdling take place, then, it is coagulated, chopped, heated; the separation of whey, shaping, pressing, salting take place, then it is ripened., afterwards the resulted product is packaged.

BACKGROUND OF THE INVENTION

With regard to human nutrition our most important foodstuffs include milk products, and within this cheese consumption plays a decisive role. The cheese production of the world is approximately 15 million tons/year.

This dynamically growing tendency is a world phenomenon and surveys have shown that in addition to their relatively low prices cheeses are good dietetic foodstuffs with high lactalbumen and calcium and relatively low caloric value, resp.

The production processes of some cheeses (soft, mould, semi-hard, hard cheeses) and cheeses made of sour milk (products made of curd) changed significantly in the course of the last century, because of technical development and owing to the possibilities, which were made available by microbiological research.

The dry matter content of standard cows milk is 12,5%, whereas 87.5% of it is water. In the course of various procedures about 50% of this dry matter content (12,5%) can be extracted into the cheese, whereas the rest of the dry matter content (6.0–6,5%) stays with the whey, the by-product of cheese production.

The above description indicates that whey contains 94.0% water, but because of its high protein content it is suitable for further processing. Because of its high water content, further processing of the way is expensive, thus processing whey is not wide-spread in some countries, in the latter case it is used either for foraging, or a significant part of it is discharged into sewers. After such discharges the products of decomposition are a threat to environment.

Whey obtained in the course of cheese production has a lactalbumin content of 0.5–1.6%, this can be as much as one third of the total lactalbumen content of milk, and depending on the type, contains also some fat (0.4–1.6%). Fat can be separated from whey by centrifuging, but it is more difficult to re-use the whey treated this way. No procedure for the extraction of lactalbumin remaining in the whey, with the aim to improve the principal cheese product, has been elaborated yet. The extraction of lactalbumin from the whey is expensive and secondary products are the result (whey powder, whey cell, etc).

According to the state of art, processes used in cheese production are more-or-less the same. All processes are based on full base milk, which undergoes processing in raw- or sterilized form. (Manual for the Milk Processing Industry, Mez gazdasági Kiadó, Budapest, 1981, pages 428–522).

As regards sour milk products (curds), part homogenizing is a well-known method, yet it is not widely used in practice, because of the low improvement of yield. Experiments are going on with the aim to increase the yield by treating cream under low pressure. This is an important point in the first line in curd production. A solution different from standard, traditional production is the application of an ultrafilter.

This solution is focused on the extraction of the total contents, thus it can be used only within a small spectrum, thus being just one more choice in the practice.

The object of the present invention is to provide a process for reducing lactalbumin content of whey and thus improving the yield of the principal cheese product. We wish to realize the improvement of the yield by the extraction of excess lactalbumin. The extraction of excess lactalbumin increases yields, improves the quality, and is more environmental friendly because of its reduced presence in the components of whey.

SUMMARY OF THE INVENTION

According to the invention the cheese milk is skimmed, the separated cream is treated, then the fat content of the base milk (vat milk) is adjusted by means of this cream, after this it is cultured, if necessary, additives are used, then in certain cases it is curdled, after curdling the product is chopped, heated, separated from whey, shaped, pressed, salted, ripened, and packaged at last. The milk undergoes full skimming, in the course of which cream with 15–35 m % is obtained, which cream in turn, in order to distribute fat molecules, is treated by ultrasonic waves, or led into and treated in a ball and tube mill, in a Venturi-tube, in an atomizer, or is treated by counterstreaming so, that the diameter of the butterfat balls is significantly reduced to a value of a maximum of 2.5 microns, preferably to 0.6–1.3 microns. Then, if necessary, the cream is sterilized, and then the vat milk (base milk) is adjusted to the necessary fat content, the content of the kettle milk is cold-pre-ripened (optimum duration: 10 hours, temperature 6° C.). At the beginning of the vat work the kettle milk is heated to 28°–40° C. (the optimum temperature for curdling), then culturing, adding of additives, curdling are performed. After curdling chopping, heating, and the separation of whey take place. After this shaping, pressing, salting, ripening, and packaging are performed.

The basis of my invention is the recognition that the separation of butterfat and then the "chopping" of butterfat balls without the rupture of the membranes, and then the of the butterfat with milk significantly increase the precipitation of lactalbumin which is a component of the principal product (cheeses). Further details of the invention are described using an example from the practice.

Cow's milk "earmarked" for cheese production is separately stored in milk silos, thus providing for equalizing. The milk prepared for cheese production is heated in heat exchangers up to 50° C., then in a skimming machine milk is divided up into fat-free milk and cream with 28 m % cream. The skimmed milk is sterilized at 74° C., then it is stored after being cooled down to 6° C. Cream is treated at 45° C. by an ultrasonic equipment, then it is sterilized at 95° C. Then it is cooled down to 6° C. and stored for 10 hours at this temperature. Then the fat content of the kettle milk is adjusted to 3.6 m %, using the skimmed milk and cream, after being pre-heated to 35° C., 1.5% culture (mould fungus) and the agent for curdling is added, then it is allowed to stand.

The resulting coagulated matter is chopped according to the known method, then whey is removed by filtration (until dropping is fully terminated).

As a result of the production, I didn't see cream development on the coagulated matter in case of treated cream (there was no fat precipitation), coagulation time was shorter, and the whey dropping down was uniform and clean.

In case of the traditional process used for comparison strong development of cream (precipitation of fat), slow coagulation, irregular and troubled whey could be observed on the coagulated matter.

Surplus cheese production was 20.21%, even after the feeding period.

Lactalbumin content of the whey:
in case of conventional process: 1.165%
in case of the process according to the invention: 0.0661%

Microscopic picture:
In case of the procedure according to the invention: the fat balls are small and finely distributed.
In case of conventional process used for comparison: fat balls of different size, irregular distribution, partly clogs and deformation.

Ripening process:
In the case of the procedure according to the invention:
normal yeast-fungus development
regular white mould fungus growth
tastes good
In case of conventional process:
strong yeast development
strong contamination by foreign mould fungus
taste-irregular It can be established that the invention is suitable for increasing lactalbumin extraction to an extent not encountered so far in the milk processing industry. The increase of extraction at the same time involves quality improvement. The process according to the invention doesn't involve significant cost increase (investment included).

I claim:

1. A process for the production of cheese having an increased lactalbumin content from milk which comprises the steps of:
   (a) skimming the milk to obtain a fat free milk and cream having a butterfat content of 15 to 35 m % in the form of fat balls and separating the fat free milk from the cream;
   (b) treating at about 45° C. the cream having a butterfat content of 15 to 35 m % in the form of fat balls with ultrasonic radiation or in a Venturi tube to reduce the diameter of the fat balls to 0.6 to 1.3 microns without rupturing a membrane coating the fat balls, sterilizing the cream at about 95° C., cooling the sterilized cream to about 6° C., and storing the cream for at least 10 hours;
   (c) sterilizing the fat free milk at about 74° C., and then cooling the fat free milk to about 6° C.;
   (d) adjusting fat content of the fat free milk by adding thereto the cream treated according to steps (b) and (c) to form a kettle milk having a fat content of about 3.6 m %;
   (e) culturing the kettle milk using a mould fungus to form a cultured milk product;
   (f) coagulating, chopping and heating the cultured milk product and separating whey having a decreased lactalbumin content from the cultured milk product to form curds having an increased lactalbumin content;
   (g) shaping, pressing and salting the curds with an increased lactalbumin content; and
   (h) ripening the curds with an increased lactalbumin content to form the cheese with an increased lactalbumin content.

2. The process defined in claim 1 wherein according to step (b) the cream is treated with ultrasound radiation at a wavelength of 10,000 to 50,000 Hz.

3. The process defined in claim 2 wherein the duration of the treatment with ultrasound radiation is up to 300 seconds.

4. The process defined in claim 1 wherein according to step (d) the sterilized milk and the sterilized cream are heated together to a temperature of 28° to 40° C. before the culturing of step (e).

* * * * *